(12) United States Patent
Epitaux et al.

(10) Patent No.: US 7,329,054 B1
(45) Date of Patent: Feb. 12, 2008

(54) OPTICAL TRANSCEIVER FOR COMPUTING APPLICATIONS

(75) Inventors: Marc Epitaux, Sunnyvale, CA (US); Peter E. Kirkpatrick, San Francisco, CA (US)

(73) Assignee: Aprius, Inc., Sunnyvale, CA (US)

( * ) Notice: Subject to any disclaimer, the term of this patent is extended or adjusted under 35 U.S.C. 154(b) by 0 days.

(21) Appl. No.: 11/681,950

(22) Filed: Mar. 5, 2007

(51) Int. Cl.
*G02B 6/36* (2006.01)
(52) U.S. Cl. .......................................... 385/89; 385/93
(58) Field of Classification Search ...................... None
See application file for complete search history.

(56) References Cited

U.S. PATENT DOCUMENTS 6,592,269 B1 * 7/2003 Brophy et al. ................. 385/92
6,939,058 B2 * 9/2005 Gurevich et al. ............. 385/93

OTHER PUBLICATIONS

Yoshikawa, Takashi, et al., "'Generation Free Platform,' Technology for the Dependable Network Platform," Network Platform Technology Domain, *NEC Technical Journal* (*2006 Special Issue: Dependable IT and Network Technology*), 1(3):21-25.
Yoshikawa, Takashi, et al., "Optical Interconnection as an IP Macro of COMS LSis (OIP)," 12 sheets (with two slides per sheet).
Benner, A.F., et al., "Exploitation of Optical Interconnects in Future Server Architectures," *IBM J. Res. & Dev.*, Jul./Sep. 2005, 49(4/5): 755-775.

* cited by examiner

*Primary Examiner*—Michelle Connelly-Cushwa
*Assistant Examiner*—Chris Chu
(74) *Attorney, Agent, or Firm*—Townsend and Townsend and Crew LLP

(57) ABSTRACT

A compact optical transceiver is provided in which a substrate provides for an alignment surface for optical fibers and a lens assembly provides the necessary optical paths for coupling to laser diode and photodetector structures. Appropriate electrical connections on the substrate enable the substrate to be directly connected to a printed circuit board, grid array socket, and the like.

28 Claims, 9 Drawing Sheets

OPTICAL TRANSCEIVER FOR COMPUTING APPLICATIONS

BACKGROUND OF THE INVENTION

With the continuing growth in performance of computing technology, the interconnect bandwidth required among microprocessors, memories, and input/output devices continues to increase. Such high speeds create increasing problems for the technology used for interconnections among the microprocessors, memories, and input/output devices. For example, copper trace technology, such as conventionally employed on printed circuit boards, is expected to be limited to 15-20 Gigabits per second as a result of signal degradation, power dissipation, and electromagnetic interference unavoidable at such high clock speeds.

Manufacturers of many electronic products have sought to address the limitations of copper by using more exotic substrates with lower dielectric loss or using more sophisticated input/output equalizers at the transmitter and receiver. Unfortunately all of these potential solutions are costly and power consumptive. Therefore traditional interconnect scaling will no longer satisfy performance requirements. Defining and finding solutions beyond copper and low dielectric loss material will require innovation in design, packaging and unconventional interconnect technology.

One alternative attracting increasing attention is the use of optical interconnect technology. Optical communication technology has been used for many years in long distance applications such as telephony and the internet, and is now sometimes implemented for use in shorter distance applications for the enterprise such as storage area networks and rack-to-rack interconnections. Such optical technology has already demonstrated that at high frequencies, the optical fibers provide longer distance-higher bandwidth capability as compared with electrical cables, yet minimize loss in the transmitted signal.

Unfortunately, optical interconnect technology has associated with it a separate set of implementation difficulties. These difficulties include optical coupling efficiencies, fiber alignment, complex packaging technologies, including hermeticity, thermal management, electrical performance, and manufacturability—the ease of assembly and amenability to automation. Thus, generally speaking, current optical modules or transceivers like SFP, 300 pins MSA, Xenpack, Xpak, X2 and XFP form factors provided by various suppliers including Emcore, Finisar, Agilent, and Bookham are still complex to manufacture and expensive.

Additionally for substantial utility in the computing market, optical transceivers also need (1) extremely low power consumption to compete with electrical solutions, (2) a smaller form factor adapted for and appropriate to the computer industry, and (3) very large interconnect bandwidth to provide data consummate with processing power. One example of a prior art solution is the IBM Terabus project (*Exploitation of optical interconnects in future server architectures*, Benner et al., 49 IBM J. Res. & Dev. No. 4/5, July/September 2005). In this concept the transmitter and receiver modules are separate and require a complex structure with multiple chips/modules mounted on a substrate— one module with an array of transmitters and another module with an array of receivers.

A novel solution adapted for computing application to interconnect processing units while increasing communication bandwidth, maintaining an ultra small form factor, decreasing power consumption, simplifying and enabling automated assembly is required.

BRIEF SUMMARY OF THE INVENTION

This invention provides an electro-optical transceiver which includes a substrate having a generally planar configuration to which all of the components of the transceiver are mounted. The substrate includes a cavity on the lower surface. Electrical contacts for connections to external circuitry around the cavity are provided on a lower surface of the substrate, and, in one embodiment, a further set of electrical contacts is disposed on the upper surface of the substrate for being connected to an integrated circuit. The integrated circuit is affixed to the upper surface of the substrate and connected to the second set of contacts. A multi-port lens assembly is also affixed to the substrate to receive light from optical fibers, and transmit light to optical fibers coupled to the substrate. Each of the light-sensing and light-emitting devices is electrically connected to the integrated circuit. The general orientation of the transceiver enables electrical contacts to be made in one direction and heat to dissipate in the opposite direction, with connections to optical fibers being made perpendicularly to the direction of heat dissipation.

In a further embodiment of the invention, the integrated circuit is mounted into the substrate cavity under the lens assembly. A heat-spreading device affixed to the substrate dissipates heat from the integrated circuit.

Embodiments of the present invention advantageously decrease the complexity of the manufacturing and reduce the size of the transceiver. By eliminating the transceiver enclosure and using the substrate as a multi-function core element, we reduce the number of components of the transceiver. The substrate acts here as a skeleton. Through elimination of optical pluggability, the transceiver size and form factor are favorably reduced. Furthermore associated with low cost manufacturing technology capable of mass-production, e.g. molding, lamination, wafer processing, and automated pick and place, the transceiver cost is minimized.

In another embodiments of this invention a new alignment technology for the optical components is provided. Enabled by the short communication distance between computing nodes (below 100 meters), the use of multi-mode fibers alleviate the packaging and alignment cost of the transceiver compared to the long distance single-mode fiber applications (greater than 300 m). Precise alignment guiding structure is provided to accurately reference the EO converters to the substrate, the substrate to the optical element and finally the optical element to the optical fibers.

A further embodiment of this novel transceiver utilizes multiple channels (parallel optics). By implementing multi-channels to the transceiver, the cost per unit bandwidth is spread across the packaging cost. Preferably all the different channels share common components, for example, the same substrate, the same optical element, the same analog integrated circuit and the same bundle of fibers.

Other features and advantages of the invention will be apparent in view of the following detailed description and preferred embodiments.

DETAILED DESCRIPTION OF THE INVENTION

Figure 1:
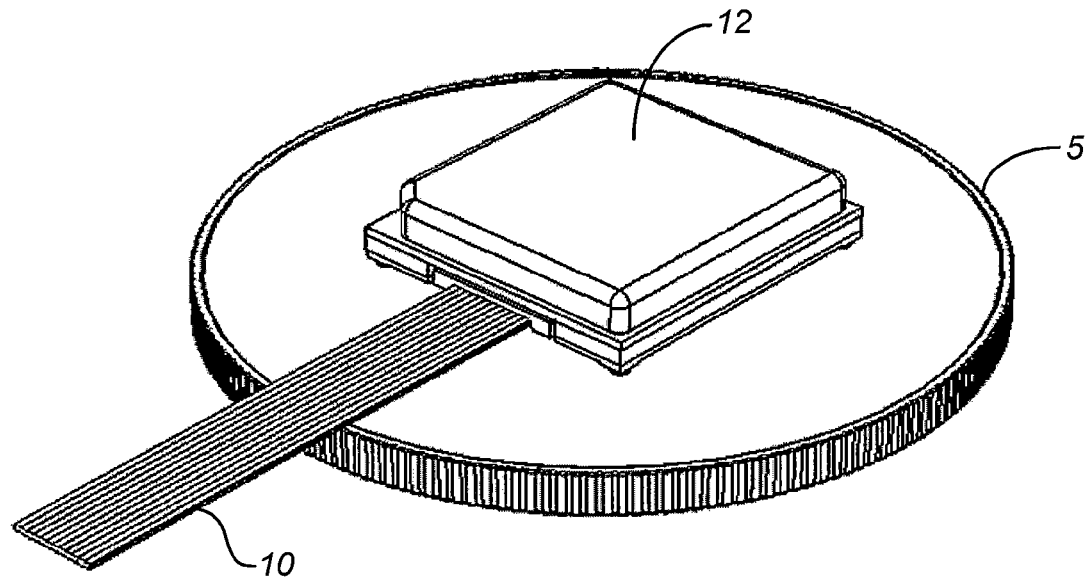
FIG. 1 is a top view of an optical transceiver.

FIG. 1 is a top view of an optical transceiver according to a preferred embodiment of this invention. The transceiver is depicted on a U.S. quarter dollar coin 5 to illustrate the compact size of the transceiver. The transceiver functions to convert optical signals arriving on optical fibers 10 to electrical signals, and provides them as an output from electrical contacts on the lower surface of the transceiver (not shown in FIG. 1, but see FIG. 2). In addition electrical signals provided to the contacts are converted to optical signals and provided on the optical fibers 10. The device preferably operates as a parallel multimode transceiver with multiple ports, preferably six outputs and six inputs. Of course, different numbers of inputs and outputs, either balanced or unbalanced, can be used. The module 12 illustrated in FIG. 1 includes appropriate electrical terminals, enabling it to be directly mounted on a printed circuit board (PCB), for example, using compliant contacts to ensure electrical connections as shown in more detail in FIG. 2.

Figure 2:
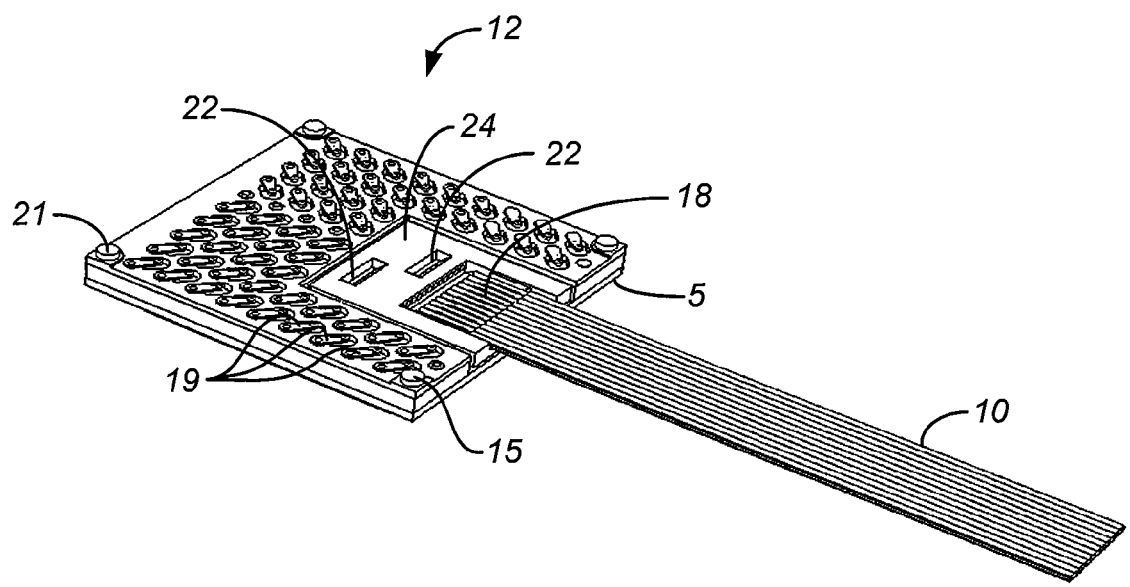
FIG. 2 is a bottom view of the optical transceiver of FIG. 1.
Figure 6:
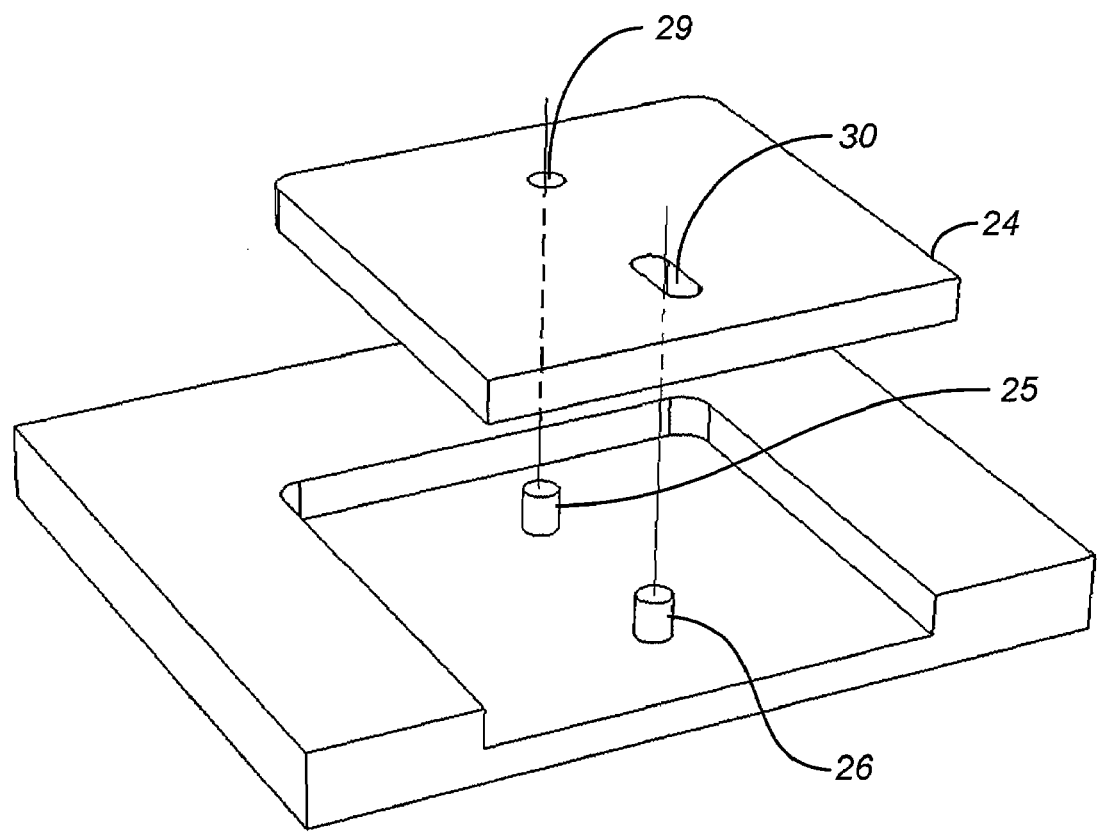
FIG. 6 is an exploded view of alignment guide pins and holes used to position the multi-port lens.

FIG. 2 illustrates the optical transceiver viewed from the lower surface to which electrical connections are provided via electrical contacts 19. The optical fibers 10 are shown as mounted to the multi-port lens 24. The multi-port lens assembly is preferably made from Ultem (transparent organic material) and manufactured by precise injection molding, a typical approach for manufacturing in high volumes. The fibers are positioned in the appropriate locations to align them with optical paths to the multi-port lens 24 by a corresponding series of grooves 18. The multi-port lens is mounted onto the substrate 15 and is precisely aligned to it by guiding pins (See FIG. 6). In this manner the optical fibers, the multi-port lens and the optoelectronic devices can be aligned appropriately, as will be described in more detail below.

Light is provided to the fibers by a series of light-emitting diodes, preferably vertical cavity surface emitting laser (VCSEL) diodes, mounted in the substrate cavity, and light is received from the fibers by a series of light sensing elements, preferably p-i-n (or PIN). Such photodiodes provide an intrinsic (undoped) region between the n- and p-doped regions. PINs or other suitable photo-detecting devices, are positioned in the same substrate cavity. The emitting diodes and the photo-detecting devices are precisely positioned relative to the substrate guiding pins (See FIG. 6). The light is reflected through a 90° angle by internal reflection interface which is part of cavities 22 shown in FIG. 2. The lenses 24, internal reflection cavities 22, photodetectors, and laser diodes will all be described in more detail below. In one implementation the VCSEL array and the PIN array are staggered to minimize the width of the transceiver and minimize optical and electrical interference between transmitters and receivers.

In the depicted implementation, compliant contacts 19 are provided across the lower surface of the substrate 15. In one embodiment, the contacts are provided by resilient metal "fingers" positioned over recessed areas in the substrate. In this manner, bumps on the fingers or on the board to which the transceiver is connected, are mechanically pressed against the compliant fingers to assure reliable electrical connections.

Figure 3:
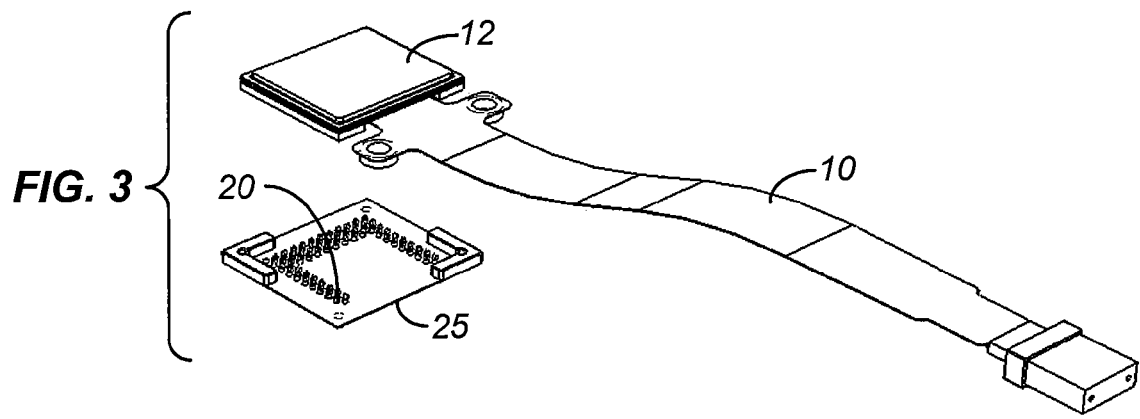
FIG. 3 illustrates a device for electrically connecting the optical transceiver.

In the preferred implementation (See FIG. 3) a compliant contact socket 25 is used to provide electrical contact from the transceiver 12 to the underlying printed circuit board (PCB). The contact is created through rubber bumps 20 filled with metallic particles between the metallic pads of the PCB and the metallic pads on the lower surface of the substrate. This socket 27 is sandwiched between the device and the PCB. The bumps are compressed by a loading force applied on the top of the transceiver 12. Such socket technology is available from Tyco Electronics and is referred to by Tyco as the HXC-LGA system. In this technology, conductive particles are molded into an insulating material formed in a columnar shape. When the insulating material is compressed, the metal particles with in the column link together and provide an electrical interconnection through the column.

Figure 4:
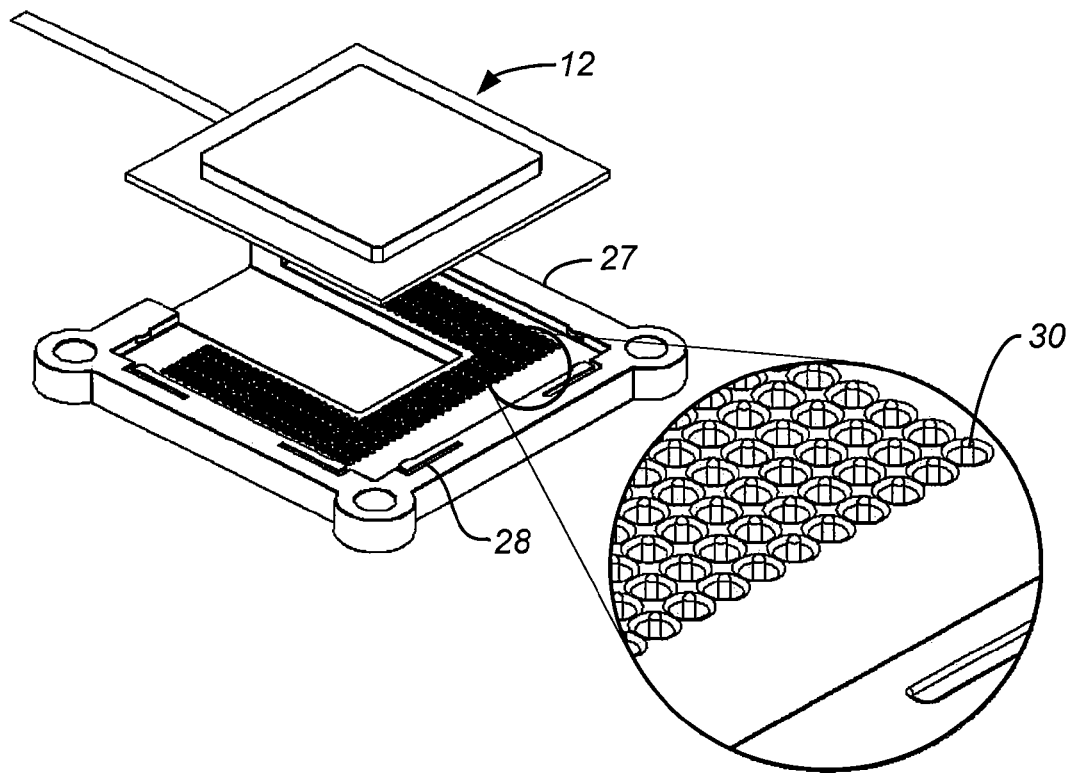
FIG. 4 illustrates a device for electrically connecting the optical transceiver.

Another approach to providing electrical connections between the transceiver and the underlying PCB is shown in FIG. 4. As shown there, a Land Grid Array socket 27 (commercially available) has positioning compliant fingers 28. Those fingers hold the optical transceiver tightly to the socket and enable a precise alignment of the socket electrical pins 30 to the corresponding substrate lower contact pads. The electrical pins in the socket are preferably compliant enabling them to be pressed tightly against the conductive regions. The socket is soldered to the PCB. Similarly to the previous approach, the socket is sandwiched between the device and the PCB. The socket pins 30 are compressed by a loading force applied on the top of the transceiver. Because the pads are on the underside of substrate 15 they are not visible in FIG. 3.

Figure 5:
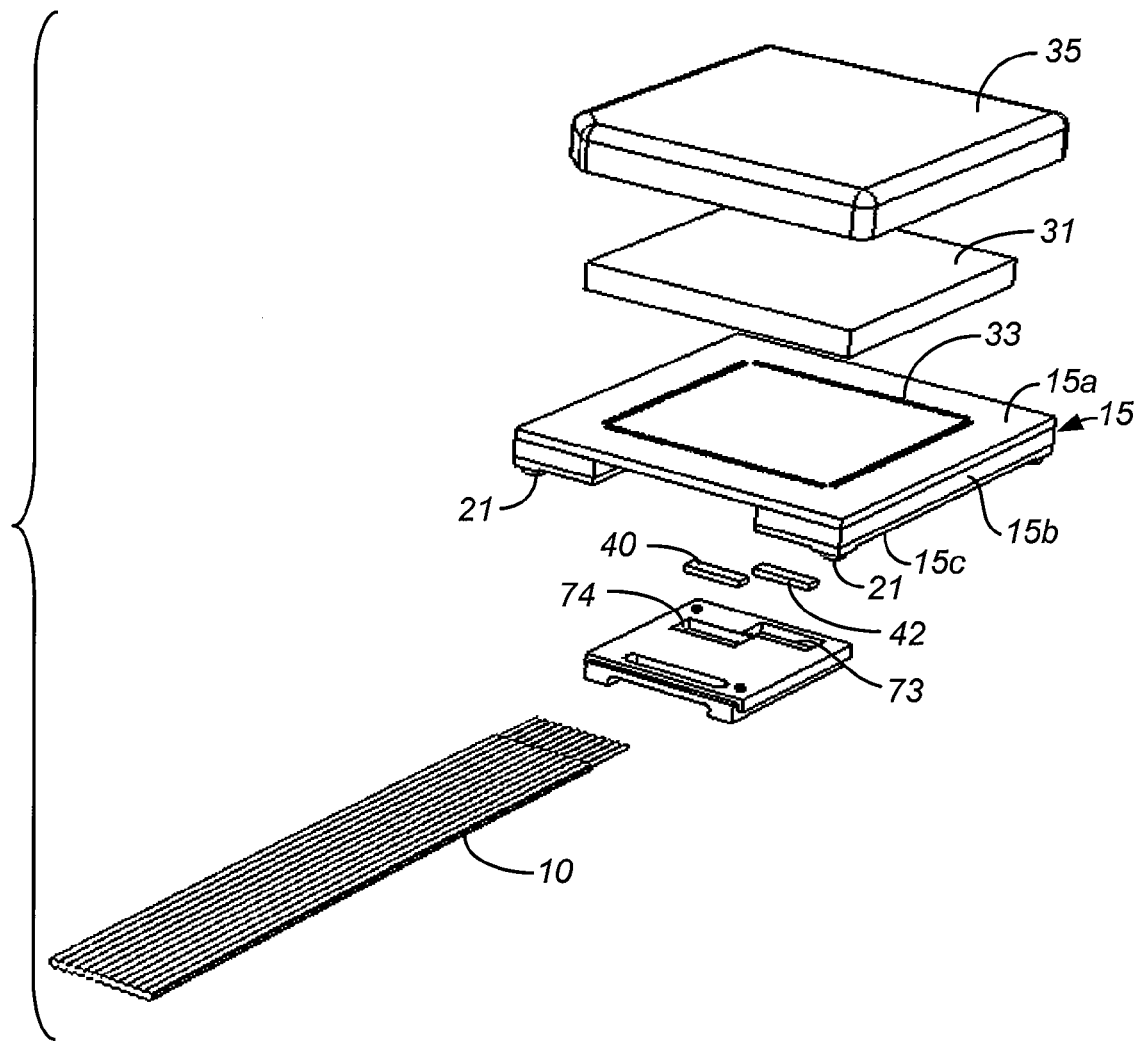
FIG. 5 is an exploded view of one embodiment of the optical transceiver.

FIG. 5 illustrates the structure of the optical transceiver in further detail. As shown, a multilayered substrate 15 is employed. Each layer in the substrate preferably comprises material compatible with the other layers. Conventional ceramic or organic material systems are used. Layer 15a includes contact regions 33 for interconnection with an analog integrated circuit 31. The two devices may be coupled using conventional interconnect technology. In the preferred embodiment, flip chip bonding is used to connect the bonding pads (not shown) on the lower surface of chip 31 to a corresponding series of interconnect pads 33 on the substrate layer 15a. Layer 15a is bonded to layer 15b. Layer 15c includes the resilient electrical contacts. The contacts are formed by chemical etching and/or stamping. Pins 21 at each corner of layer 15c are used to assure appropriate alignment between the transceiver and the PCB or other underlying device to which it connects. In addition, in a preferred embodiment, the sides of the substrate are coated with a metal layer to reduce electromagnetic interference.

A heat spreading cap 35 provides a hermetic seal for the integrated circuit 31 with the substrate, thereby preventing undesired particulates, moisture, and the like from interfering with the operation of the integrated circuit 31. Additionally the cap provides immunity to electro-magnetic interference and prevents electro-magnetic radiation from the transceiver. Cap 35 is preferably affixed to substrate 15 using solder or conductive epoxy. If desired a heat sink (not shown) can be affixed to the heat-spreading cap 35 to dissipate heat resulting from operation of the integrated circuit.

FIG. 5 also illustrates the array of photodetectors 40 and the array of laser diodes 42. Photodetectors 40 and laser diodes 42 are commercially available components, for example, if implemented as VCSELs and PINs, from Emcore Corporation. These devices electrically couple to the analog circuit 31 through wirebonds, contact pads and substrate vias. In a further embodiment of this invention, the light emitting devices may be directly coupled to the substrate lower surface contacts without being coupled to drivers. Similarly the light sensing devices may be directly coupled to the substrate lower surface contacts without being coupled to TIAs.

The optical alignment of the transceiver is enabled by special features in the substrate. (See FIG. 6.) The optoelectronic devices are placed in a tight alignment by use of two guiding pins 25, 26 on the underside of the substrate 15 (see FIG. 6). The guiding pins are positioned with close tolerance, typically on the order of a few microns. They are press fitted or bounded to the substrate and separated by a known distance. This dimension can have a looser tolerance, e.g. 50 to 100 um, enabling less expensive packaging material and assembly technology. The first pin 25 is used as geometrical reference point. Laser diodes and photo-detectors are positioned to an accurate distance with reference to this guiding pin 25. The combination of the two pins 25, 26 determine an accurate orientation of the arrays of laser diodes and photodetectors. With these two guiding features the laser diodes and photo-detectors can be very accurately oriented. Alternatively, the guiding pins can be replaced by guiding spheres.

Similarly the multi-port lens 24 has two openings. The first round hole 29 has a precise diameter and tightly fits the guiding pin 25. The second hole 30 is oblong. The oblong shape is aligned with an axis formed between the first round hole 29 and the second hole 30. The oblong hole 30 has a precise width that tightly fits the second guiding pin 26 diameter. The shape is oblong to accommodate the loose tolerance on the distance between the two guiding pins. This approach allows precise alignment between the lens and the substrate guiding pins, and therefore to the laser diodes and photo-detectors.

Figure 7:
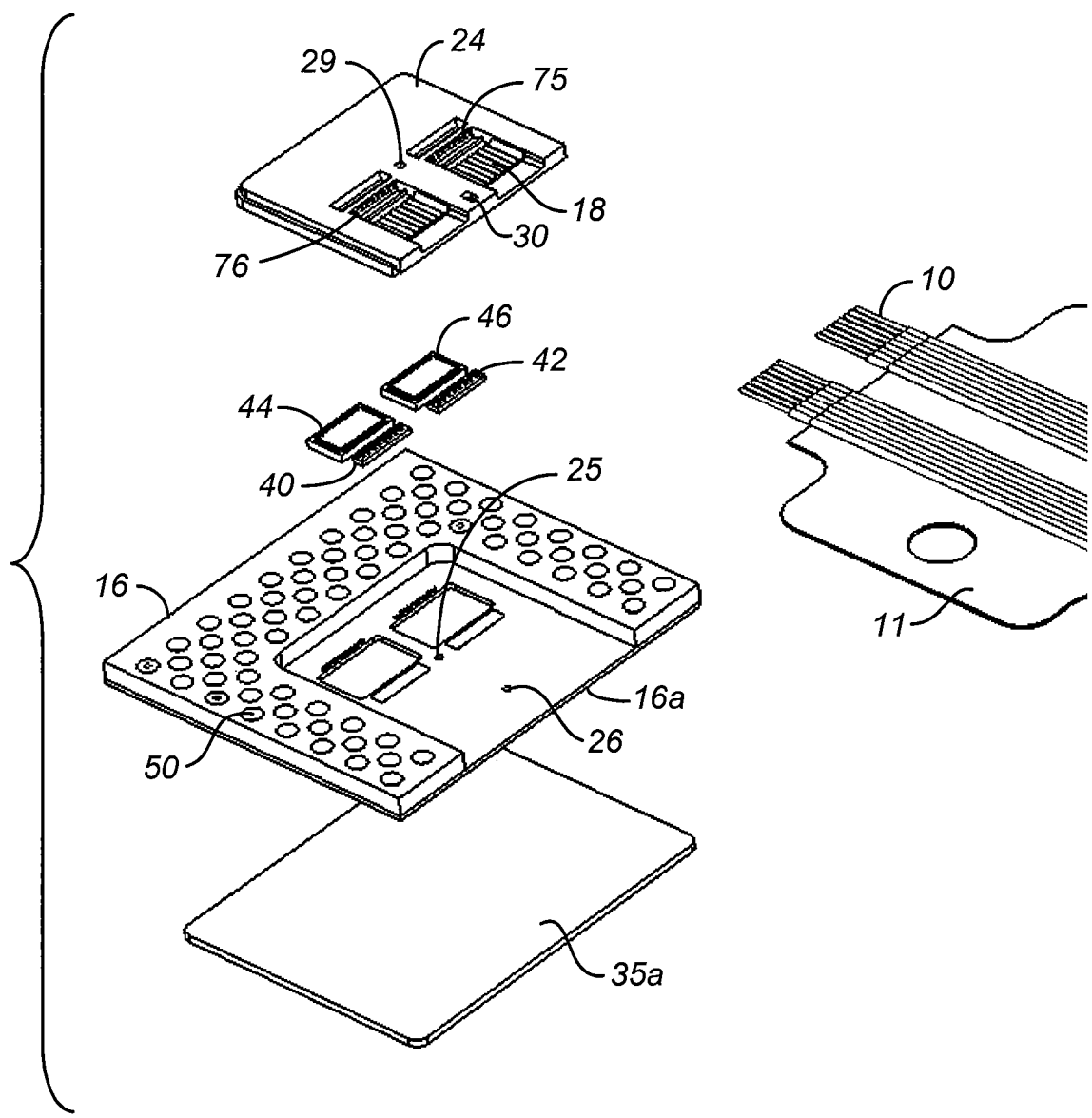
FIG. 7 is an exploded view of an alternate construction for the optical transceiver.

The multiple lenses, the fibers grooves 18 and the guiding holes 29, 30 are all injection-molded into the multi-ports lens 24 (see FIG. 7). This fabrication process ensures that all features are very precisely aligned relative to each other. Thus by appropriate dimensioning and sizing of the arrays and corresponding openings in a multi-port lens 24, the photodetectors 40 and laser diodes 42 can be appropriately aligned within the multi-port lens to interface with the optical fibers 10.

FIG. 7 illustrates an alternative structure for the optical transceiver. As shown there, the photodetectors 40 and laser diodes 42 are coupled to trans-impedance amplifiers (TIA) 44 and laser diode drivers 46, respectively. The connections between these devices are all electrical and accommodated by well known contact technology between the two components. The drivers, TIAs and electro-optical (EO) converters reside in a multilayered substrate 16 as shown. Substrate 16 is preferably of similar construction and materials as described above for substrate 15. The upper surface (lower in the illustration of FIG. 7) of the substrate is coupled to a heat-spreading plate 35a to dissipate heat from the electronic devices. The lower surface (upper in the illustration of FIG. 5) of the substrate 16 includes the array of conventional electrical connections 50, for example of the types discussed in conjunction with FIG. 2, adapted to be connected to appropriate external modules, sockets, printed circuit boards, or the like. The multi-port lens assembly 24 is appropriately dimensioned to fit within the recessed region of the substrate 16a and encompass the EO converters and drivers. As with the embodiment of FIG. 2, a series of grooves or other appropriate alignment mechanisms molded into the lens assembly 24 ensures that the optical fibers align with the lenses to provide an appropriate optical connection between the fibers and the converters. In the implementation depicted, the ribbon of fibers 10 is shown mounted to an underlying organic flexible layer 11 for connection to the transceiver. As with further embodiments of FIG. 5, the light emitting devices may be directly coupled to the substrate lower surface contacts without being coupled to drivers. Similarly the light sensing devices may be directly coupled to the substrate lower surface contacts without being coupled to TIAs.

Figure 8:
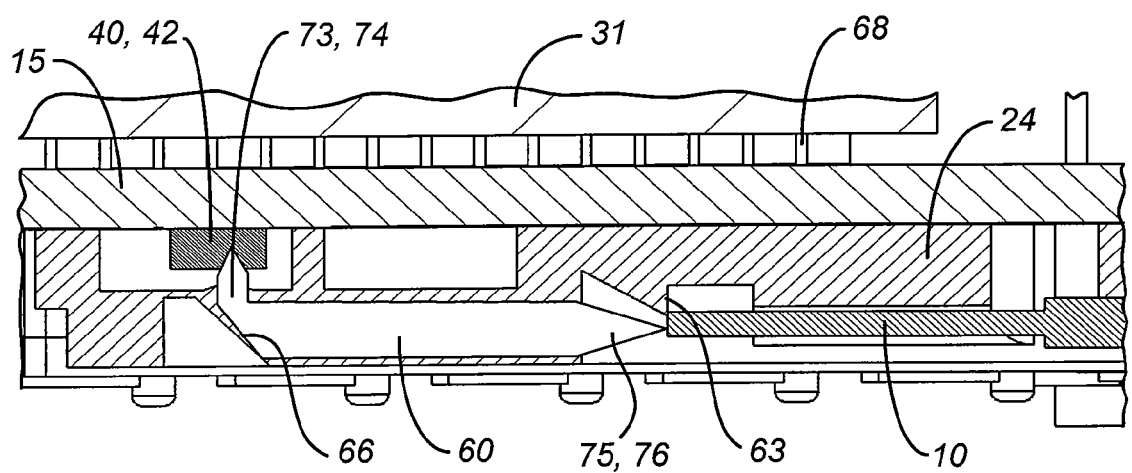
FIG. 8 is a cross sectional view showing an interior portion of the optical transceiver.

FIG. 8 is a cross-sectional view illustrating a cross section through the transceiver shown in FIG. 2. As illustrated in FIG. 8, grooves 18 into which the optical fibers are positioned and stopping features 63 in the multi-port lens assembly 24 cause the optical fibers 10 to align with light path 60 in the multi-port lens assembly 24. Note that protrusion 63 positions the fibers in the longitudinally-desired location, while the grooves position the fibers in a perpendicular direction. The electro-optical converters 40, 42 are shown and positioned at essentially right angles to the longitudinal axis of the light path 60. The collimating lenses 73 collimate the beams from the light-emitting elements, preferably VCSELs 42, and a total internal reflection interface 66 turns the beams. Then focusing lenses 75 focus the beams into the optical fibers 10. On the photodetector side, the collimating lenses 76 collimate the multimode fiber beams and a total internal reflection interface 66 reflects the beams. The beams are focused through focusing lenses 74 onto the photodetectors. Solder bumps 68 couple the substrate 15 to the integrated circuit 31. As mentioned above, vias (not shown) through the intervening layers in substrate 15 enable the electro-optical converters to be electrically connected to the integrated circuit 31.

Figure 9:
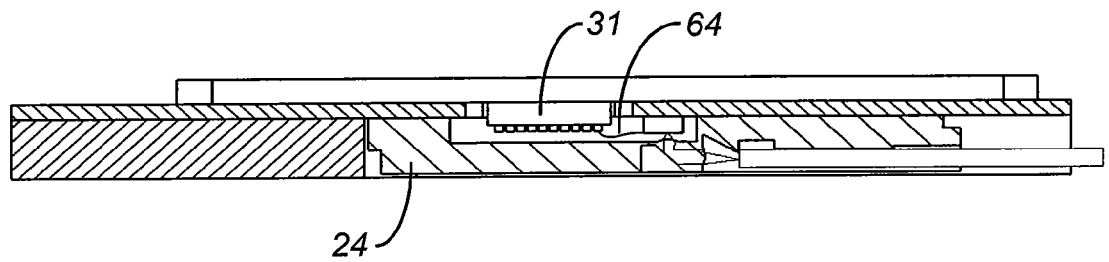
FIG. 9 is a cross sectional view showing an alternative optical transceiver.

FIG. 9 illustrates in cross section the embodiment of the optical transceiver shown in FIG. 7. The diagram of FIG. 9 is similar to that of FIG. 8. Note, however, that the driver or analog circuit 31 is mounted into the substrate recess under the lens assembly 24 enabling a thinner, more compact package. Additionally the TIA and driver circuits are wire bonded 64 to the substrate and the electro-optical converters.

Figure 10:
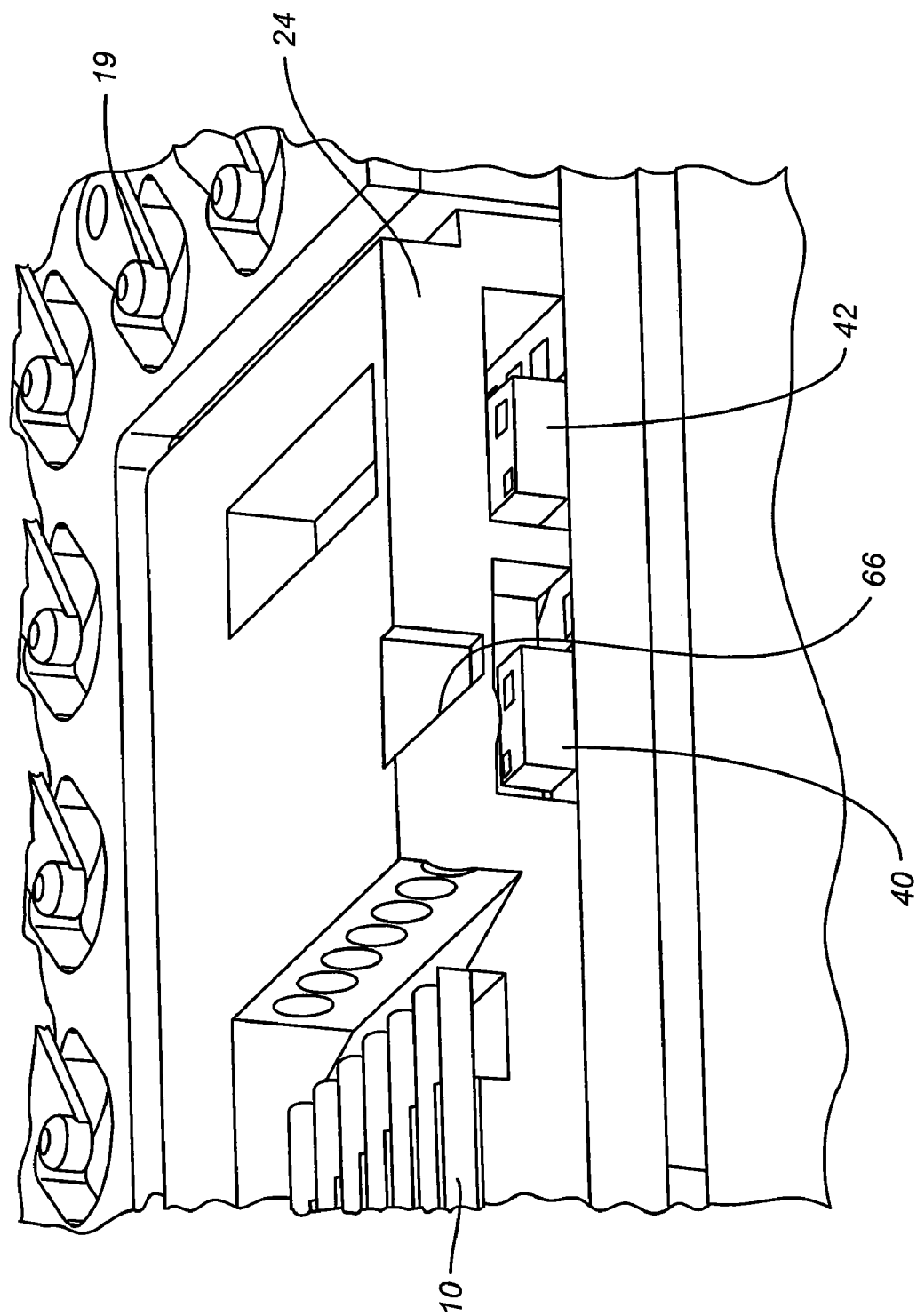
FIG. 10 is a perspective view illustrating the light path within the optical transceiver.
Figure 11:
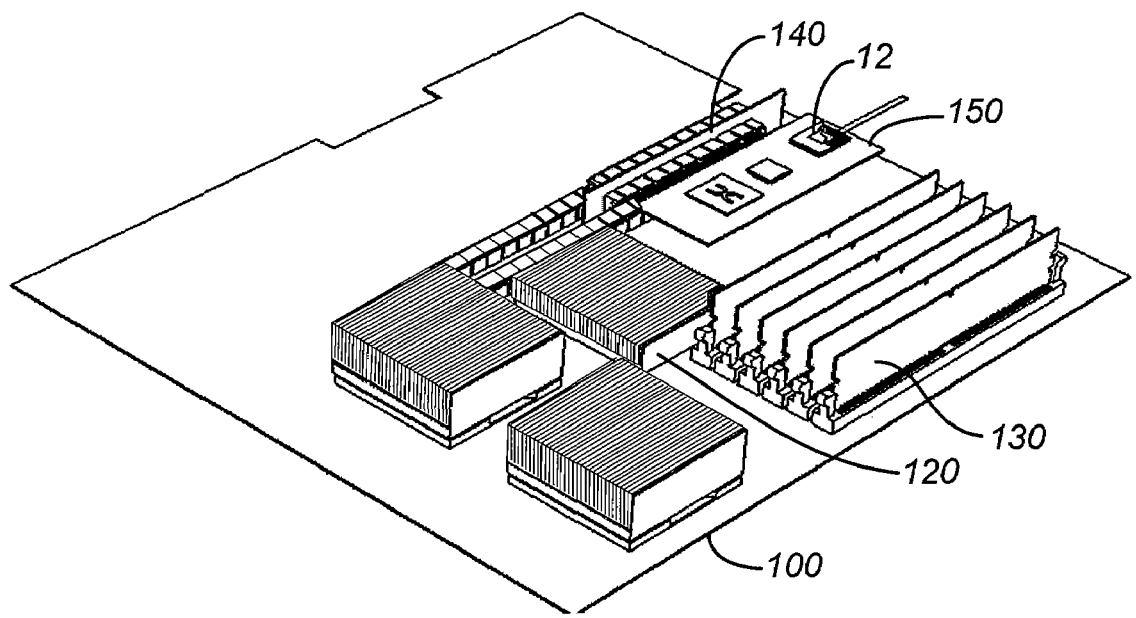
FIG. 11 illustrates a server motherboard with an optical host adapter card.
Figure 12:
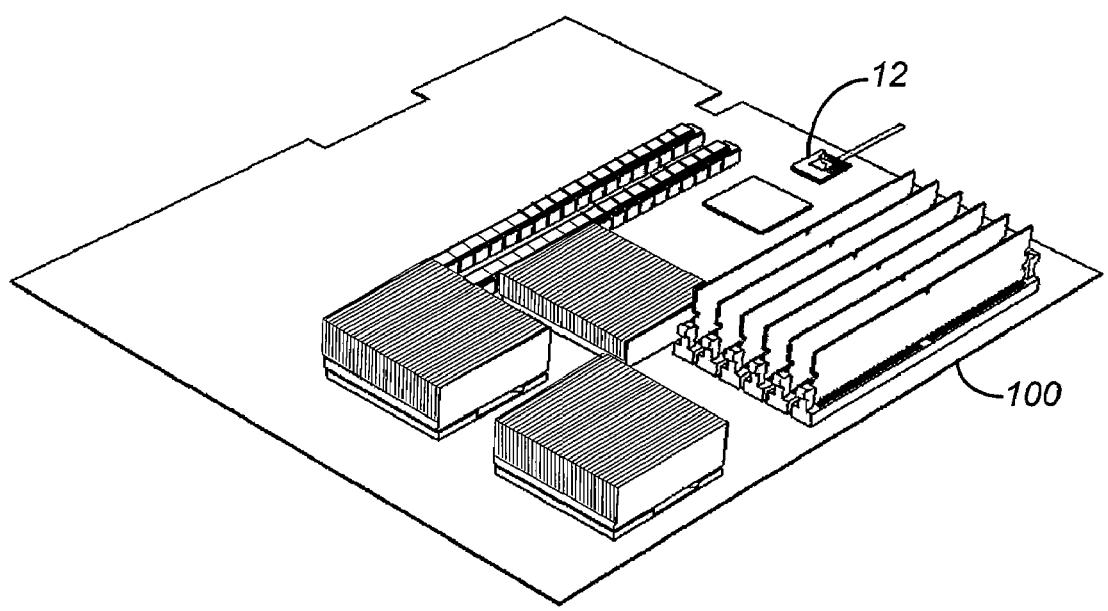
FIG. 12 illustrates a server motherboard with an integrated optical transceiver.
Figure 13:
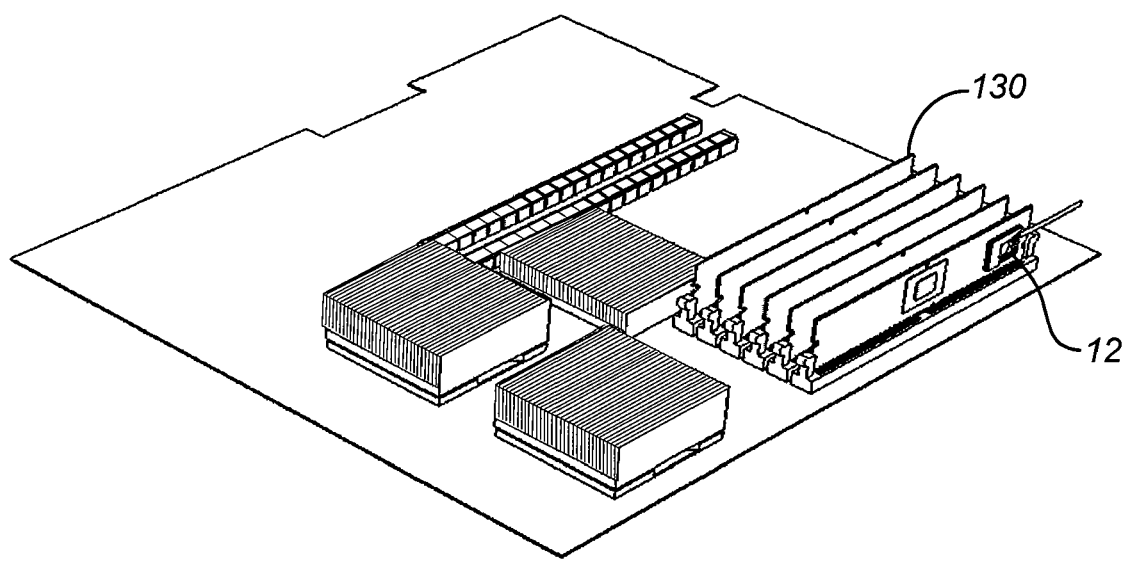
FIG. 13 illustrates a server motherboard with an optical DIMM extension for the transceiver.

FIG. 10 is a perspective view illustrating in more detail the lens assembly 24, the manner in which the optical fibers 10 interface with the lens assembly 24, the internal reflection surface 66, and the staggered arrangement of the electro-optical converters 40 and 42. The compliant contacts are also shown. The staggered arrangement enables a regular pitch all along the fiber ribbon (250 um pitch). If placed immediately adjacent to each other the VCSELs array and PINs array would not allow this periodic pitch, or would require (wasted) dark fibers between the receiving fibers and the transmitting fibers FIGS. 11-13 illustrate typical applications for a transceiver 12 according to the embodiments described above. As shown in FIG. 11, the transceiver 12 is mounted on an optical host card adapter 150 for being coupled to a PCI express bus. The illustration shows a server board 100 having two CPUs 110, a memory controller hub 120, a series of memory cards 130, and a PCI express bus riser 140. An optical host card adapter 150 plugs into the bus riser 140 to enable optical connections between the server board and its affiliated hardware with the desired external systems via the optical transceiver 12. As mentioned earlier, the use of the optical transceiver and host card 150 are particularly suitable for input/output intensive applications, graphic processing, and other high bandwidth server applications.

FIG. 12 illustrates a similar server motherboard to that depicted in FIG. 11. In FIG. 12, however, the optical transceiver 12 is integrated onto the motherboard 100, eliminating the need for the riser card 140 and the optical host card 150.

FIG. 13 illustrates another implementation of the optical transceiver. In this case the transceiver is employed in one slot of the memory card bus and used to provide a high speed connection to additional memory. In the implementation shown in FIG. 13, additional memory can be added to the server without need of replacement of the server motherboard 100.

As described above, the optical transceiver of this invention provides a transceiver in which a multilayer substrate is used as a base component. Each of the other components—the photodetectors, laser diodes, integrated circuit, lens, and heat spreader, are all attached to the substrate. The substrate itself provides a structural role as the skeleton of the transceiver, eliminating need for a special enclosure. Thus, in contrast to other conventional optical transceiver designs, this transceiver does not require a special enclosure. As also described, the transceiver is easily electrically coupled to a printed circuit board, a grid array socket, or other conventional electronic interfaces. The resulting structure provides electrical connections, heat conduction, and electromagnetic radiation barriers as needed. The transceiver provides for a smaller form factor than convention optical transceivers. The photodetectors and laser diodes can be provided on the same substrate in nearby locations, in contrast to the need for use of separate modules as in some prior art solutions.

Although various embodiments and implementation details of the optical transceiver of this invention have been described above in a preferred embodiment, it will be appreciated that the scope of the invention is determined by the appended claims.

What is claimed is:

1. An electro-optical transceiver comprising:
   a substrate having a generally planar configuration including an upper surface, a lower surface and an edge between the upper and the lower surfaces, and having a recess therein with a bottom surface with at least one opening therein;
   a multi-port lens affixed to the bottom surface of the recess;
   an integrated circuit affixed to the bottom surface of the recess,
   a plurality of light emitting devices and a plurality of light sensing devices mounted to communicate optically with the multi-port lens, each of the plurality of light emitting devices and the plurality of light sensing devices being electrically coupled to the at least one integrated circuit;
   a set of electrical contacts disposed on the lower surface of the substrate for connection to external circuitry, the set of electrical contacts being coupled through the substrate to the at least one integrated circuit;
   a plurality of optical fibers coupled through the edge of the substrate to the multi-port lens, individual ones of the optical fibers being positioned to communicate optically with individual ones of the light emitting devices and the light sensing devices;
   wherein optical signals received on the plurality of optical fibers are converted to electrical signals to be supplied to the integrated circuit, wherein electrical signals from the integrated circuit are converted to optical signals for transmission on the optical fibers, and wherein the electrical signals are provided to the lower surface of the substrate, heat is dissipated from the upper surface of the substrate, and optical signals are transmitted and received along the edge of the substrate.

2. A transceiver as in claim 1 wherein the multi-port lens includes lens apparatus for directing light from the optical fibers onto the light sensing elements and directing light from the light emitting devices into the optical fibers.

3. A transceiver as in claim 2 wherein:
   the plurality of light emitting devices is affixed to the substrate to emit light in a direction perpendicular to the lower surface;
   the plurality of light sensing devices is affixed to the substrate to receive light in a direction perpendicular to the lower surface;
   the multi-port lens includes a pathway for light from the optical fibers to be transmitted onto the light sensing devices, and light from the light emitting devices to be transmitted into the optical fiber.

4. A transceiver as in claim 3 wherein the lens assembly further includes a series of grooves and a series of stops for positioning the optical fibers in alignment with the light sensing devices and the light emitting devices.

5. A transceiver as in claim 2 wherein one of the multi-port lens and the substrate include at least two guide features, and the other includes at two corresponding openings, to enable alignment of the multi-port lens and the substrate with each other.

6. A transceiver as in claim 5 wherein the corresponding openings comprise a cylindrical opening and an elongated opening.

7. A transceiver as in claim 2 wherein the substrate doesn't include a recess region and wherein the multi-port lens and the integrated circuit are mounted directly on the lower surface of the substrate.

8. A transceiver as in claim 1 wherein the set of electrical contacts comprise electrically conductive regions on the lower surface of the substrate for connection to external circuitry, the external circuitry including a carrier with compliant bumps containing metal particles to be pressed against corresponding ones of the electrically conductive regions on the lower surface of the substrate.

9. A transceiver as in claim 1 wherein the first set of electrical contacts comprises a series of compliant finger portions positioned over recessed areas in the substrate to enable them to be pressed against contact regions coupled to the external circuitry.

10. A transceiver as in claim 1 wherein the set of electrical contacts comprise electrically conductive regions on the lower surface of the substrate for connection to external circuitry, the external circuitry including a carrier having compliant fingers to secure the substrate to the carrier and wherein the carrier includes compliant pins adapted to be pressed against corresponding ones of the electrically conductive regions on the lower surface of the substrate.

11. A transceiver as in claim 1 wherein the plurality of light emitting devices comprise vertical cavity surface emitting laser diodes and the plurality of light sensing devices comprise photodiodes.

12. A transceiver as in claim 1 further comprising a heat spreader over the integrated circuit to improve heat spreading from the integrated circuit and to reduce electromagnetic radiation.

13. A transceiver as in claim 1 wherein the light emitting device and the light sensing device are aligned to the substrate with guide features in the substrate.

14. A transceiver as in claim 1 wherein the substrate includes a metallic coating disposed around the edge to reduce electromagnetic radiation.

15. An electro-optical transceiver comprising:
a substrate having a generally planar configuration including an upper surface, a lower surface and an edge between the upper and the lower surfaces, and having a recess therein with a bottom surface with at least one opening therein;
a first set of electrical contacts for connection to external circuitry, the first set of electrical contacts being disposed on the lower surface of the substrate;
a second set of electrical contacts disposed on the upper surface of the substrate, the second set of contacts being electrically connected through the substrate to the first set of contacts;
an integrated circuit affixed to the upper surface of the substrate and electrically connected to the second set of contacts;
a multi-port lens affixed to the bottom surface of the recess;
a plurality of light emitting devices and a plurality of light sensing devices mounted to communicate optically with the multi-port lens, each of the plurality of light emitting devices and the plurality of light sensing devices being electrically coupled through the substrate to the integrated circuit; and
a plurality of optical fibers coupled through the edge of the substrate to the multi-port lens, individual ones of the optical fibers being positioned to communicate optically with individual ones of the light emitting devices and the light sensing devices;
wherein optical signals received on the plurality of optical fibers are converted to electrical signals to be supplied to the integrated circuit, wherein electrical signals from the integrated circuit are converted to optical signals for transmission on the optical fibers, and wherein the electrical signals are provided to the lower surface of the substrate, heat is dissipated from the upper surface of the substrate, and optical signals are transmitted and received along the edge of the substrate.

16. A transceiver as in claim 15 wherein the multi-port lens includes lens apparatus for directing light from the optical fibers onto the light sensing elements and directing light from the light emitting devices into the optical fibers.

17. A transceiver as in claim 16 wherein:
the plurality of light emitting devices is affixed to the substrate to emit light in a direction perpendicular to the lower surface;
the plurality of light sensing devices is affixed to the substrate to receive light in a direction perpendicular to the lower surface;
the multi-port lens includes a pathway for light from the optical fibers to be transmitted onto the light sensing devices, and light from the light emitting devices to be transmitted into the optical fiber.

18. A transceiver as in claim 17 wherein the lens assembly further includes a series of grooves and a series of stops for positioning the optical fibers in alignment with the light sensing devices and the light emitting devices.

19. A transceiver as in claim 16 wherein one of the multi-port lens and the substrate include at least two guide features, and the other includes at two corresponding openings, to enable alignment of the multi-port lens and the substrate with each other.

20. A transceiver as in claim 19 wherein the corresponding openings comprise a cylindrical opening and an elongated opening with the elongated direction in the axis formed by the two openings.

21. A transceiver as in claim 19 wherein the light emitting device and the light sensing device are aligned to the substrate with guide features in the substrate.

22. A transceiver as in claim 16 wherein the substrate doesn't include a recess region and wherein the multi-port lens and the integrated circuit are mounted directly on the lower surface of the substrate.

23. A transceiver as in claim 15 wherein the set of electrical contacts comprise electrically conductive regions on the lower surface of the substrate for connection to external circuitry, the external circuitry including a carrier with compliant bumps containing metal particles to be pressed against corresponding ones of the electrically conductive regions on the lower surface of the substrate.

24. A transceiver as in claim 15 wherein the first set of electrical contacts comprises a series of compliant finger portions positioned over recessed areas in the substrate to enable them to be pressed against contact regions coupled to the external circuitry.

25. A transceiver as in claim 15 wherein the first set of electrical contacts comprise electrically conductive regions on the lower surface of the substrate for connection to external circuitry, the external circuitry including a carrier having complaint fingers to secure the substrate to the carrier and wherein the carrier includes compliant pins adapted to be pressed against corresponding ones of the electrically conductive regions on the lower surface of the substrate.

26. A transceiver as in claim 15 wherein the plurality of light emitting devices comprise vertical cavity surface emitting laser diodes and the plurality of light sensing devices comprise photodiodes.

27. A transceiver as in claim 15 further comprising a metallic cap over the integrated circuit to improve heat spreading from the integrated circuit and to reduce electromagnetic radiation.

28. A transceiver as in claim 15 wherein the substrate includes a metallic coating disposed around the edge to reduce electromagnetic radiation.

* * * * *